(12) United States Patent
Singh et al.

(10) Patent No.: US 7,333,018 B2
(45) Date of Patent: Feb. 19, 2008

(54) ASSET LOCATION SYSTEM WITH ENHANCED ACCURACY

(75) Inventors: Ajeet Singh, Bangalore (IN); Renish Pynadath, Bangalore (IN); Abhijit P. Rao, Bangalore (IN); Krishnan Subramanian, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 193 days.

(21) Appl. No.: 11/188,688

(22) Filed: Jul. 25, 2005

(65) Prior Publication Data

US 2007/0018829 A1 Jan. 25, 2007

(51) Int. Cl.
*G08B 13/14* (2006.01)

(52) U.S. Cl. .................. 340/572.4; 340/10.1; 340/3.1; 340/825.49

(58) Field of Classification Search ............ 340/572.1, 340/10.1, 539.3, 539.16, 572.4, 572.8, 5.8, 340/3.1, 825.49, 10.5
See application file for complete search history.

(56) References Cited

U.S. PATENT DOCUMENTS

| | | | |
|---|---|---|---|
| 5,920,287 A * | 7/1999 | Belcher et al. ............. 342/450 |
| 6,211,781 B1 | 4/2001 | McDonald |
| 6,509,829 B1 * | 1/2003 | Tuttle ......................... 340/10.1 |
| 6,714,121 B1 | 3/2004 | Moore |
| 7,180,420 B2 * | 2/2007 | Maurer .................... 340/572.1 |
| 7,187,287 B2 * | 3/2007 | Ryal ........................ 340/572.1 |
| 2002/0145534 A1 | 10/2002 | Dempsey |
| 2002/0167417 A1 | 11/2002 | Welles, II et al. |
| 2003/0030569 A1 | 2/2003 | Ulrich et al. |
| 2003/0067397 A1 | 4/2003 | Trimble |
| 2003/0122685 A1 | 7/2003 | Tuttle |

FOREIGN PATENT DOCUMENTS

| | | |
|---|---|---|
| WO | WO 00231787 A1 | 4/2002 |
| WO | WO 02/44865 A3 | 6/2002 |
| WO | WO 03/063103 A1 | 7/2003 |

* cited by examiner

*Primary Examiner*—Anh V. La
(74) *Attorney, Agent, or Firm*—Schiff Hardin LLP

(57) ABSTRACT

An asset is located in an area by reading the asset, by making a first determination based on which of the readers are able to read the asset, by making a second determination based on which of the readers are not able to read the asset, and by locating the asset in the area based on both the first and second determinations.

28 Claims, 6 Drawing Sheets

ASSET LOCATION SYSTEM WITH ENHANCED ACCURACY

TECHNICAL FIELD OF THE INVENTION

The present invention relates to a system capable of locating assets in a large area.

BACKGROUND OF THE INVENTION

It is often difficult to determine the exact locations of a large number of items (assets) in a vast storage area. A number of technologies have been tried, but none of these technologies work particularly well.

For example, it has long been known to locate assets distributed throughout a wide area by the use of GPS technology. However, GPS technology does not work particularly well in indoor applications and is expensive to implement.

RFID technology has also been used. This technology involves attaching an RFID tag to each asset stored in an area. The RFID tag includes a memory that stores an ID which uniquely identifies the corresponding asset. A reader is used to read the ID on each of the RFID tags so as to identify and/or track the corresponding assets through the area. It has also been known to use multiple readers that implement triangulation in order to locate the RFID tags and, therefore, the corresponding assets.

One embodiment of the present invention is directed an alternative system that is useful to locate assets in a large area. A further embodiment of the present invention is directed to a method for placing the readers in the area so as to optimize the accuracy of asset location system.

SUMMARY OF THE INVENTION

In accordance with one aspect of the present invention, a method of locating an asset in an area comprises the following: reading the asset; making a first determination based on which of a plurality of readers are able to read the asset; making a second determination based on which of the readers are not able to read the asset; and, locating the asset in the area based on both the first and second determinations.

In accordance with another aspect of the present invention, a method of locating an asset by use of a plurality of readers comprises the following: storing geographical information of a plurality of virtual cells defined by boundaries, wherein the virtual cells define an area known to contain the asset, and wherein the geographical information includes information about the cells covered by each of the readers; identifying a first group of cells corresponding to those of the readers that read the asset; identifying a second group of cells corresponding to those of the readers that do not read the asset; and, locating the asset based on both the first and second groups of cells.

In accordance with still another aspect of the present invention, a method of placing readers in an area defined by a plurality of virtual cells comprises the following: computing an accuracy associated with each of a plurality of possible reader configurations, wherein each possible reader configuration corresponds to a possible configuration with which the readers can be placed in the area, and wherein each accuracy is dependent upon a number of possible cells in which an asset could be located as a function of a first number of cells covered by ones of the readers that are able to read the asset and a second number of cells covered by remaining ones of the readers that cannot read the asset; and, choosing the reader configuration that produces the highest accuracy.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
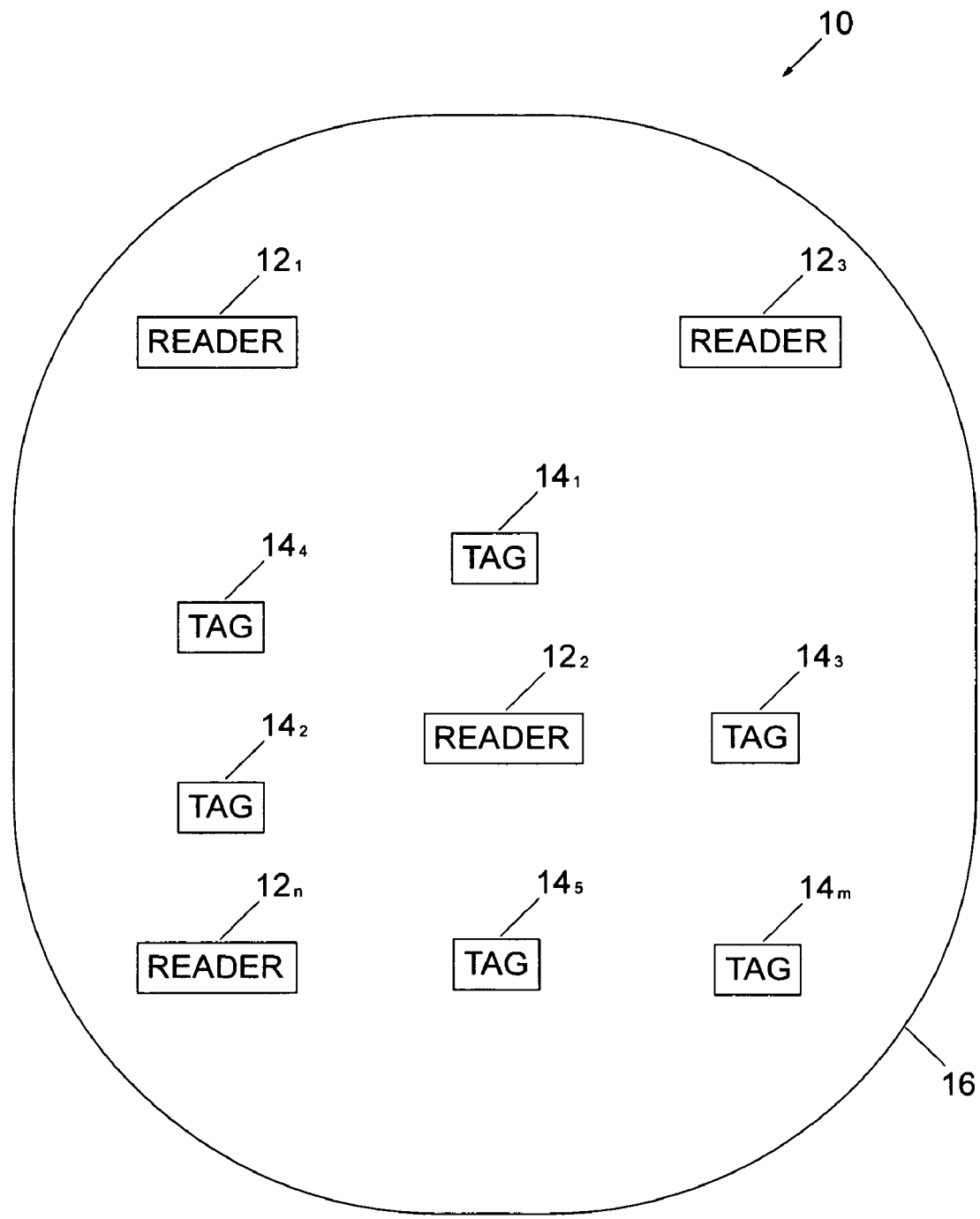
FIG. 1 illustrates an asset location system in accordance with one embodiment of the present invention.

As illustrated in FIG. 1, an asset location system 10 includes a plurality of readers $12_1, 12_2, 12_3, \ldots, 12_n$ and a plurality of RFID tags $14_1, 14_2, 14_3, 14_4, 14_5, \ldots, 14_m$. Each of the RFID tags $14_1, 14_2, 14_3, 14_4, 14_5, \ldots, 14_m$ is attached to a corresponding asset whose location within a storage area 16 is to be determined by the asset location system 10. Each of the readers $12_1, 12_2, 12_3, \ldots, 12_n$ is placed within the storage area 16 so as to read any of the RFID tags $14_1, 14_2, 14_3, 14_4, 14_5, \ldots, 14_m$ that are in the coverage area (range) of the corresponding reader.

Figure 2:
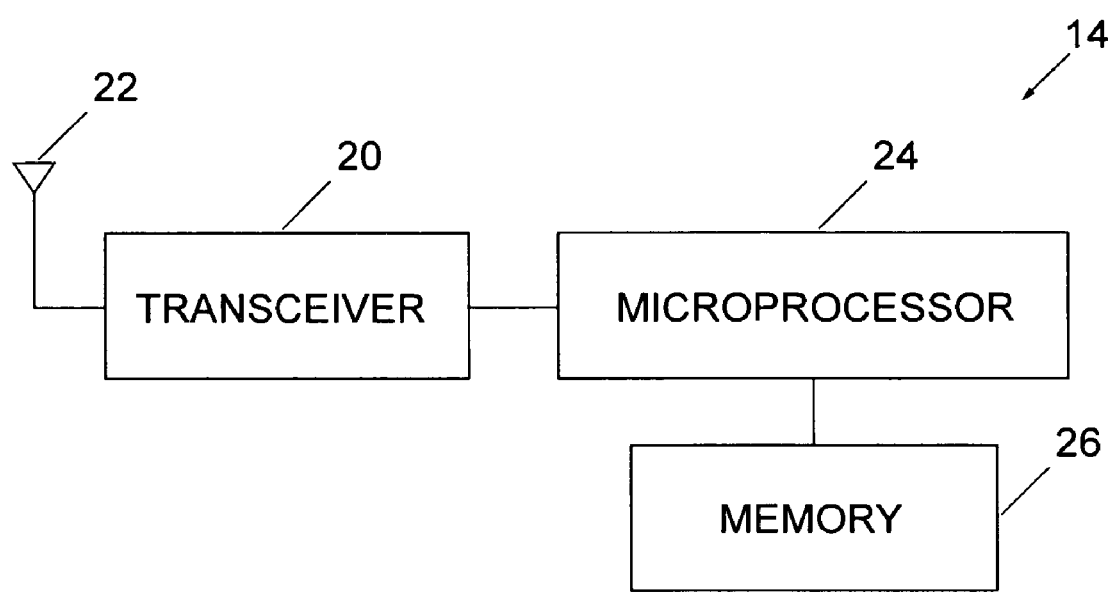
FIG. 2 illustrates additional detail of an RFID tag that can be used with the asset location system of FIG. 1.

An embodiment of an RFID tag 14 is shown in additional detail in FIG. 2 and can be used for each of the RFID tags $14_1, 14_2, 14_3, 14_4, 14_5, \ldots, 14_m$ shown in FIG. 1. The RFID tag 14 includes an RF transceiver 20 coupled between an antenna 22 and a microprocessor 24. The transceiver 20 of the RFID tag 14 may be configured, for example, to transmit information to those of the readers $12_1, 12_2, 12_3, \ldots, 12_n$ that are within the corresponding coverage areas. The transceiver 20 of the RFID tag 14 also receives communications from those of the readers $12_1, 12_2, 12_3, \ldots, 12_n$ that are within the corresponding coverage areas.

The RFID tag 14 further comprises a memory 26 coupled to the microprocessor 24. The memory 26 can be used to store the ID of the RFID tag 14 that can be read by the readers $12_1, 12_2, 12_3, \ldots, 12_n$. Accordingly, this ID serves to identify the asset to which the RFID tag 14 is attached.

The memory 26 can also store such other information as the inventory history of the asset to which the RFID tag 16 is attached. This inventory history can include, for example, the date that the asset entered inventory, the date that the asset left inventory, the length of time that the asset has been in inventory, and any movement of the asset into and out of inventory. The information stored in the memory 26 may additionally include shipping manifests that indicate when and to whom the asset is to be shipped.

Moreover, in the case where individual assets with differing destinations are shipped in the same container, an RFID container tag can be attached to the container. This RFID container tag may be arranged to store the identity and destination of each asset in the container. As assets are removed from the container, the information stored in the RFID container tag can be updated to indicate which assets have been removed, the location at which the assets were removed, and the identity of the personnel who removed the assets.

The information stored in the memory 26 may further include maintenance, repair, and date of service records showing the maintenance and/or repair history of the corresponding asset.

The RFID tag 14 may be arranged to derive the power that is required for its operation from the read signals that are transmitted so as to read the RFID tag 14. Alternatively, the RFID tag 14 may include a battery (not shown) that is coupled so that it supplies power to the transceiver 20, the microprocessor 24, and the memory 26. Moreover, sensors (also not shown) may be coupled to the microprocessor 24. These sensors may include, for example, a temperature sensor, a humidity sensor, and other sensors such as a pressure sensor, a proximity sensor, an electromagnetic sensor, an optical sensor, a mechanical sensor, a chemical sensor, and/or the like. The microprocessor 24 stores the information from the sensors in the memory 26, and this information may be read from the memory 26 by the readers $12_1$, $12_2$, $12_3$, ..., $12_n$.

If the RFID tag 14 includes a battery, the microprocessor 24 may be arranged to further sense the voltage level of this battery. Accordingly, the microprocessor 24 stores this voltage level in the memory 26, and this stored voltage level may be read from the memory 26 by the readers $12_1$, $12_2$, $12_3$, ..., $12_n$ or by other apparatus. Thus, if the voltage level of the battery as read indicates that the battery needs charging or replacement, suitable remedial action may be taken.

Figure 3:
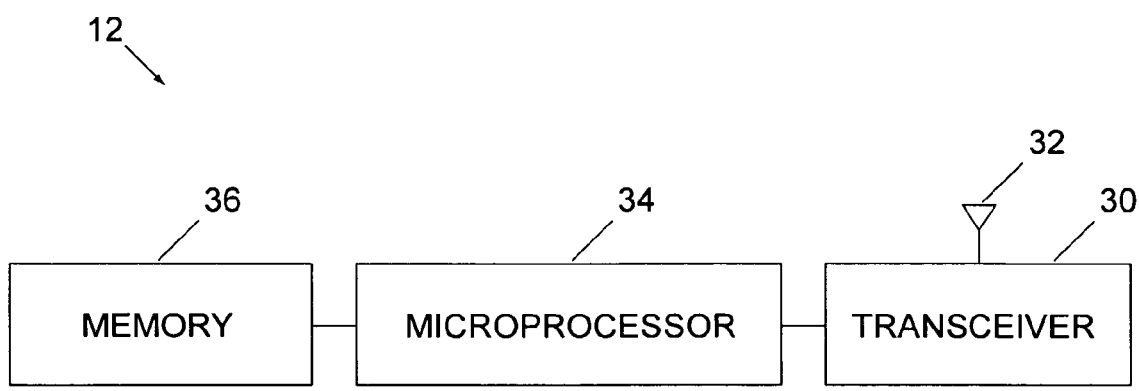
FIG. 3 illustrates additional detail of a reader that can be used to read the RFID tags attached to assets in connection with the asset location system of FIG. 1.

An embodiment of a reader 12 is shown in additional detail in FIG. 3 and can be used for each of the readers $12_1$, $12_2$, $12_3$, ..., $12_n$ shown in FIG. 1. The reader 12 includes a transceiver 30 coupled between an antenna 32 and a microprocessor 34. The reader 12 further comprises a memory 36 coupled to the microprocessor 34. The memory 36 stores the information that the reader 12 receives from the RFID tags $14_1$, $14_2$, $14_3$, $14_4$, $14_5$, ..., $14_m$. The memory 36 also stores the software that supports the locating and reading of the RFID tags $14_1$, $14_2$, $14_3$, $14_4$, $14_5$, ..., $14_m$.

Figure 4:
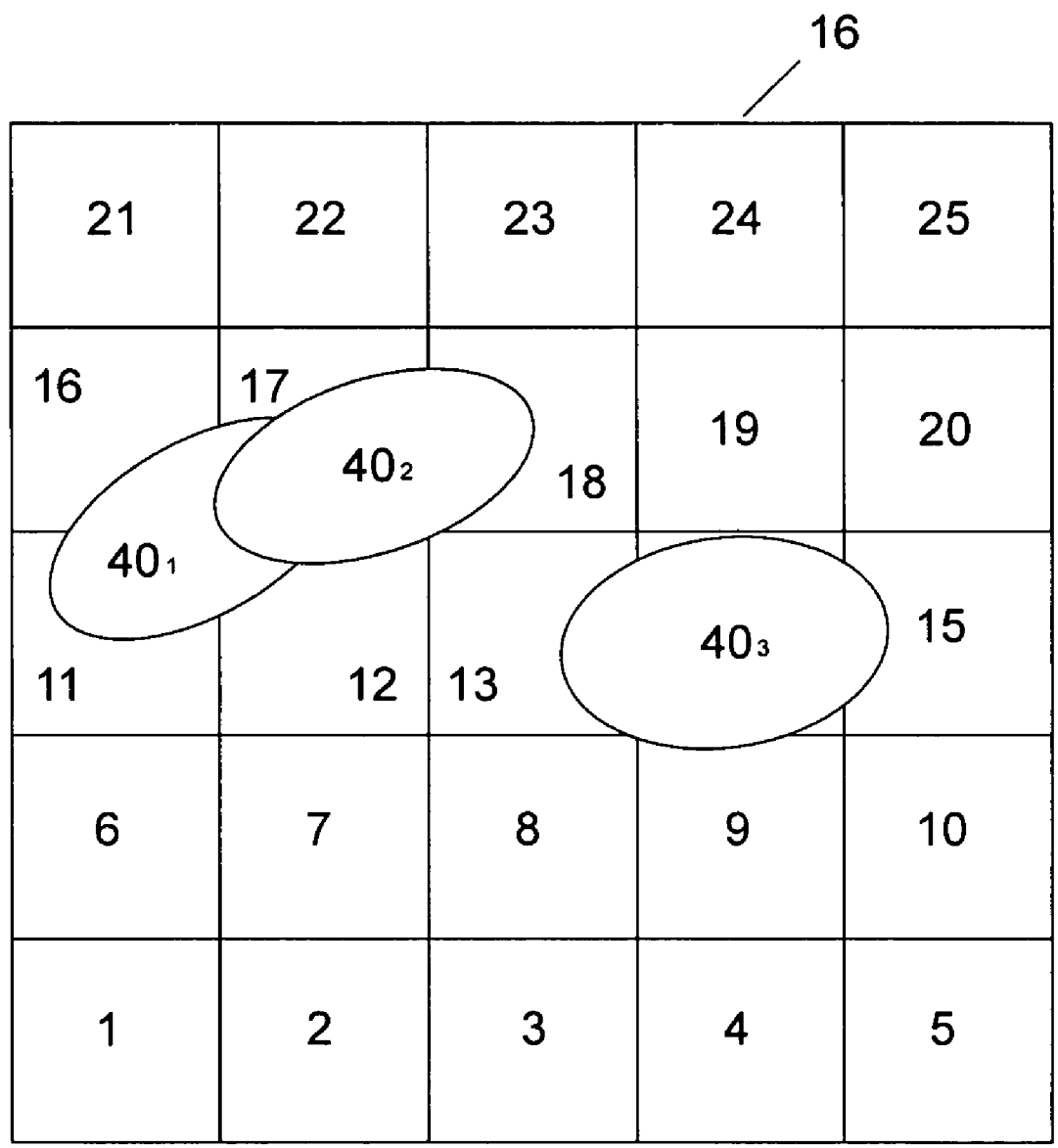
FIG. 4 illustrates by way of example a division of an area into a grid of virtual cells.

The area 16 can be divided into a grid of virtual cells as shown by way of example in FIG. 4. After being divided into a grid of virtual cells, the area 16 can be populated with a pre-defined number of the readers $12_1$, $12_2$, $12_3$, ..., $12_n$. In the example shown in FIG. 4, the area 16 has been divided into a grid of twenty-five cells and should be populated with a sufficient number of readers to adequately cover the cells, although only three readers $12_1$, $12_2$, and $12_3$ having the corresponding coverage areas or ranges $40_1$, $40_2$, and $40_3$ are shown in FIG. 4 for convenience.

Because the location and range of each of the readers in an area is known, the cell coverage of each of the readers is likewise known. The cell coverage of each reader can be stored in the memory of the corresponding reader. Alternatively, the cell coverage of each reader may be stored in a central computer.

It is conveniently but not necessarily assumed that, if the center of a cell is within the range of a reader, then the whole cell is in the range of the reader. Alternatively, it may be assumed that, if the farthest point in the cell from the location of a reader is within the range of the reader, then the whole cell is in the range of the reader. Either assumption is for the purpose of simplifying explanation and is not a necessary constraint of the present invention. Further, any area can be divided into a grid of cells that are not rectangular in shape.

When an asset with an RFID tag attached thereto is placed somewhere in the storage area 16, each of the readers in the storage area 16 attempts to read the ID stored in the RFID tag. Each of these readers that is able to read the ID of the RFID tag stores a success (or 'YES') in connection with that RFID tag. Also, each of the readers in the storage area 16 that is unable to read the ID of the RFID tag stores a failure (or 'NO') in connection with that RFID tag.

In order to determine the location of the RFID tag, the principle of inclusion and exclusion can be used. That is, the asset location system 10 makes use of the fact that some of the readers in the storage area 16 are able to read the ID of the RFID tag and, also, that some are not.

Thus, the set Y includes all of the readers that are able to read the tag and such readers may be designated by the set $(x_1, x_2, \ldots, x_i)$, and the set N includes all of the readers that are unable to read the tag and may be designated by the set $(x_{i+1}, x_{i+2}, \ldots, x_n)$, where $S_j$ is a set of all cells within the range of reader $x_j$. The following formula is used to find the tag placed in the storage area 16: (Intersection of all elements of Y)−(Union of all elements of N) if Y is not a null set, or (U)−(Union of all elements of N) if Y is a null set, where U is the universe comprising all of the virtual cells in the grid. A null set is an empty set or, in the case at hand, a set where no reader is able to read a tag under consideration.

Hence, the tag is present in the following formula:

$$(S_1 \cap S_2 \cap \ldots \cap S_i) - (S_{i+1} \cup S_{i+2} \cup \ldots \cup S_n) \quad (1)$$

The operation of this formula (1) can be illustrated by way of some examples.

For instance, the following table illustrates an example of five readers and the coverage and results of the five readers during the location of an asset in a storage area in which the five readers are placed.

| Reader | Cells which the reader covers | Result |
| --- | --- | --- |
| 1 | A, B, C, D | YES |
| 2 | B, C, D, E | YES |
| 3 | C, D, E, F | NO |
| 4 | G, H, I | NO |
| 5 | G, H | NO |

As shown by this table, reader 1 covers cells A, B, C, and D (i.e., cells A, B, C, and D are within the range or coverage area of reader 1) and reader 1 received a response from an RFID tag being read, reader 2 covers cells B, C, D, and E and reader 2 received a response from the RFID tag being read, reader 3 covers cells C, D, E, and F and reader 3 received no response from the RFID tag being read, reader 4 covers cells G, H, and I and reader 4 received no response from the RFID tag being read, and reader 5 covers cells G and H and reader 5 received no response from the RFID tag being read.

Accordingly, the RFID tag is read by readers 1 and 2 but not by readers 3, 4, and 5. The asset location system 10 uses the above formula (1), in terms of the readers 1, 2, 3, 4, and 5, to determine the following relationship:

$$(S_1 \cap S_2) - (S_3 \cup S_4 \cup S_5)$$

The asset location system 10 then substitutes the cells covered by each of the readers into this relationship to obtain the following relationship:

$$\{(A,B,C,D) \cap (B,C,D,E)\} - \{(C,D,E,F) \cup (G,H,I) \cup (G,H)\}$$

The asset location system 10 then executes the indicated intersections and unions to obtain the following relationship:

(B,C,D)−(C,D,E,F,G,H,I)

This result has two sets, one set is referred to as the intersection set and is the left-hand parenthetical of the above relationship, and the other set is referred to as the union set and is the right-hand parenthetical of the above relationship.

Finally, the asset location system 10 eliminates those cells from the intersection set that are also present in the union set to provide the answer. In the case at hand, the asset location system 10 eliminates cells C and D from the intersection set because cells C and D are also present in the union set. According to this answer, the asset is in cell B because cell B is the only remaining cell in the intersection set.

If there is more than one tag present in the storage area 16, the same formula (1) can be applied for each tag. For example, two RFID tags whose IDs are α and β are somewhere in the storage area 16. The RFID tag whose ID is α is read by readers 1 and 2 but not by the other readers. The RFID tag whose ID is β is read by readers 1, 2, and 3 but not by the other readers.

The above formula (1) is first applied to the RFID tag whose ID is α. Thus, the asset location system 10 uses the above formula (1) in terms of the readers 1, 2, 3, 4, and 5 to determine the following relationship:

$(S_1 \# S_2)-(S_3 \cup S_4 \cup S_5)$

The asset location system 10 then substitutes the cells covered by each of the readers into this relationship to obtain the following relationship:

{(A,B,C,D)∩(B,C,D,E)}−{(C,D,E,F)∪(G,H,I)∪(G,H)}

The asset location system 10 then executes the indicated intersections and unions to obtain the following relationship:

(B,C,D)−(C,D,E,F,G,H,I)

Finally, the asset location system 10 eliminates those cells from the intersection set that are also present in the union set. Accordingly, the asset location system 10 eliminates cells C and D from the intersection set because cells C and D are also present in the union set. The asset α is then in cell B because cell B is the only cell remaining in the intersection set.

The above formula (1) is then applied to the RFID tag whose ID is β. Thus, the asset location system 10 uses the above formula (1) in terms of the readers 1, 2, 3, 4, and 5 to determine the following relationship:

$(S_1 \cap S_2 \cap S_3)-(S_4 \cup S_5)$

The asset location system 10 then substitutes the cells covered by each of the readers into this relationship to obtain the following relationship:

{(A,B,C,D)∩(B,C,D,E)∩(C,D,E,F)}−{(G,H,I)∪(G,H)}

The asset location system 10 then exercises the indicated intersections and unions to obtain the following relationship:

(C,D)−(G,H,I)

Finally, the asset location system 10 eliminates those cells from the intersection set that are also present in the union set. In the case at hand, the asset location system 10 does not eliminate either of the cells C and D from the intersection set because cells C and D are not present in the union set. The asset β may be present in either cell C or in cell D because both of these cells remain in the intersection set.

For the purpose of locating the RFID tags $14_1$, $14_2$, $14_3$, $14_4$, $14_5$, ..., $14_m$, the readers $12_1$, $12_2$, $12_3$, ..., $12_n$ may all be coupled either through an RF, hardwired, or other channel to a central computer (not shown) that collects the yes and no results from the readers $12_1$, $12_2$, $12_3$, ..., $12_n$ for each of the RFID tags $14_1$, $14_2$, $14_3$, $14_4$, $14_5$, ..., $14_m$ whose locations are to be determined and applies the above formula (1) in order to locate the RFID tags $14_1$, $14_2$, $14_3$, $14_4$, $14_5$, ..., $14_m$ of concern.

Alternatively, the readers $12_1$, $12_2$, $12_3$, ..., $12_n$ may all be coupled together through an RF, hardwired, or other channel with one of the readers $12_1$, $12_2$, $12_3$, ..., $12_n$ being responsible for collecting the yes and no results from the other ones of the readers $12_1$, $12_2$, $12_3$, ..., $12_n$ for each of the RFID tags $14_1$, $14_2$, $14_3$, $14_4$, $14_5$, ..., $14_m$ whose locations are to be determined and for applying the above formula (1) in order to locate the RFID tags $14_1$, $14_2$, $14_3$, $14_4$, $14_5$, ..., $14_m$ of concern.

Other alternatives are also possible.

The readers $12_1$, $12_2$, $12_3$, ..., $12_n$ can be arranged to read the RFID tags $14_1$, $14_2$, $14_3$, $14_4$, $14_5$, ..., $14_m$ one at a time or in groups. For this purpose, one or more of the readers $12_1$, $12_2$, $12_3$, ..., $12_n$ can be arranged to trigger one or more of the RFID tags $14_1$, $14_2$, $14_3$, $14_4$, $14_5$, ..., $14_m$ to transmit their IDs. Alternatively, only one of the readers $12_1$, $12_2$, $12_3$, ..., $12_n$ can trigger one or more of the RFID tags $14_1$, $14_2$, $14_3$, $14_4$, $14_5$, ..., $14_m$ to transmit their IDs and all of the readers $12_1$, $12_2$, $12_3$, ..., $12_n$ can read all of the RFID tags $14_1$, $14_2$, $14_3$, $14_4$, $14_5$, ..., $14_m$ that are within their ranges. As a still further alternative, a device other than the readers $12_1$, $12_2$, $12_3$, ..., $12_n$ (such as the central computer discussed above) can be arranged to trigger one or more of the RFID tags $14_1$, $14_2$, $14_3$, $14_4$, $14_5$, ..., $14_m$ to transmit their IDs. Various addressing and collision avoidance schemes may be implemented by the readers $12_1$, $12_2$, $12_3$, ..., $12_n$ in reading the RFID tags $14_1$, $14_2$, $14_3$, $14_4$, $14_5$, ..., $14_m$ in order to implement the present invention.

Figure 5:
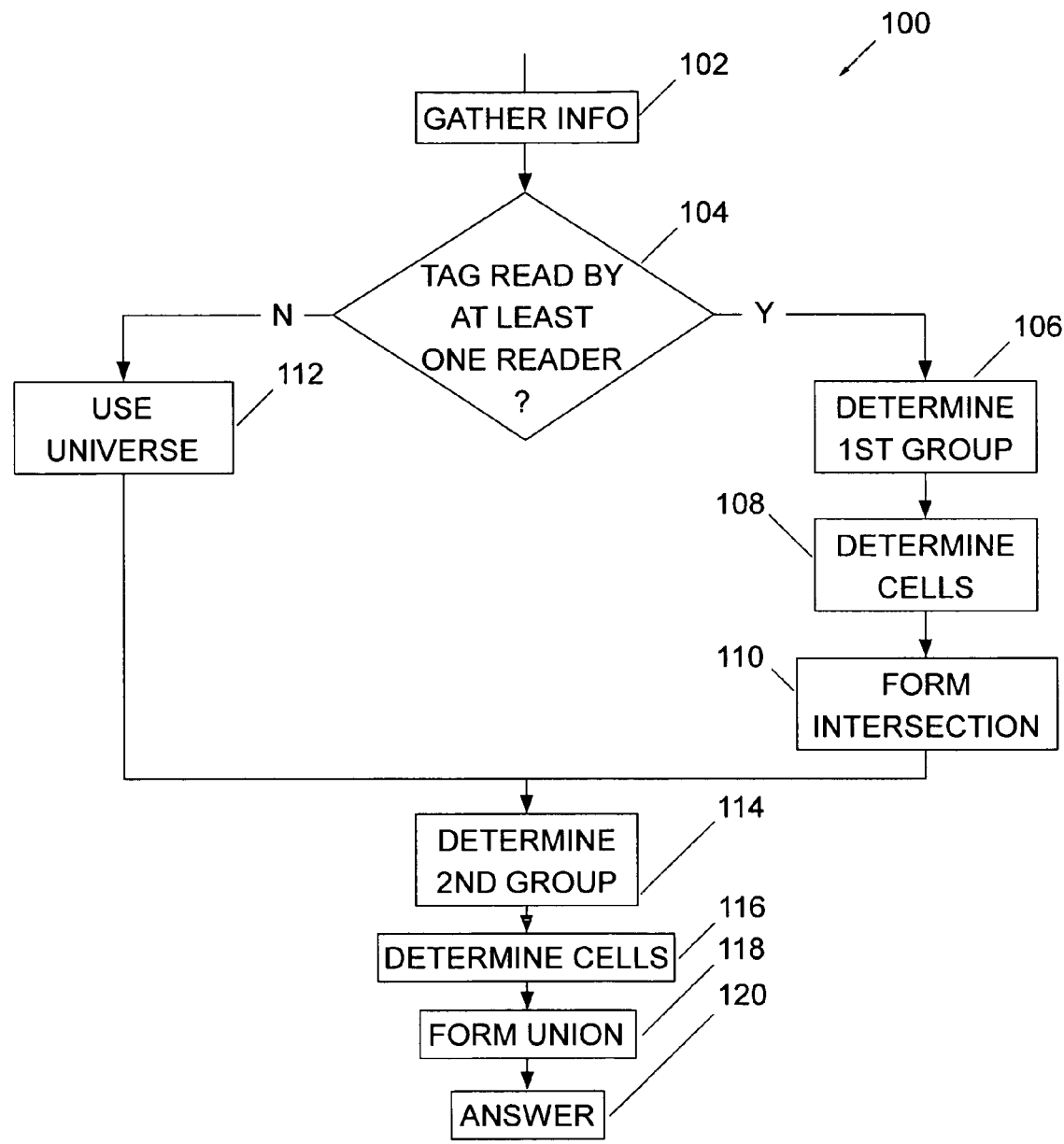
FIG. 5 shows a program illustrated as a flow chart for determining a location of an asset in an area; and, FIG. 6 shows a program illustrated as a flow chart for placing readers in an area.

FIG. 5 shows a program 100 illustrated as a flow chart for determining a location of an asset in the storage area 16. The program 100 can be executed by a central computer or by one or more of the readers $12_1$, $12_2$, $12_3$, ..., $12_n$. The program 100 begins execution after an RFID tag is read. Reading can be initiated by transmitting an inquiry signal to the RFID tag that causes the RFID tag to transmit a response signal that can be read by the readers and that, for example, contains the ID of the tag being read.

The program 100 at 102 gathers the relevant information from all of the readers. This relevant information includes an indication of which readers successfully read the tag and/or an indication of which readers could not successfully read the tag. If more than one tag is read, the information gathered at 102 is segregated by tag. At 104, a determination is made as to whether there is at least one reader that is able to read the tag. If there is at least one reader that is able to read the tag, a first group of readers is formed at 106. The first group of readers contains those readers that are able to read the RFID tag. At 108, the cells covered by the readers in the first group are determined and, at 110, the intersection of the cells covered by the readers in the first group is formed.

However, if no reader is able to read the tag, the universe U of all cells in the grid is used at 112 in place of the intersection of all cells covered by the readers actually able to read the tag.

The program 100 at 114 forms a second group of readers. The second group of readers contains those readers that are not able to read the RFID tag. At 116, the cells covered by the readers in the second group are determined. At 118, the union of the cells covered by the readers in the second group is formed.

At 120, an answer is formed by removing from the cell intersection those cells that are in both the cell intersection and the cell union. This answer contains the cell or cells containing the RFID tag that was read and, therefore, contains the asset to which this RFID tag is attached. On the other hand, if no reader is able to read the tag as determined at 112, the answer is formed at 120 by removing from the universe U those cells that are in the cell union. This answer indicates that no RFID tag was present to be read. On the other hand, if it is known that the RFID tag is indeed present in the total area, the answer means that the RFID tag was not present in the area collectively covered by all of the readers but that the RFID tag may be found in an area that is not collectively covered by the readers. This information is of value in the sense that it narrows down the field of search.

The program 100 can also be used to process multiple ones of the RFID tags. In this case, it is preferable for each reader to keep track of the identifications of the RFID tags that it is able to read so that the answers provided at 120 can be associated with each of the RFID tags that are read. For example, multiple tags can processed by the program 100 by first transmitting an inquiry signal that addresses all of the tags to be processed and by processing the responses from each of the responding tags either simultaneously or sequentially in the program 100 according to its ID.

The readers 12$_1$, 12$_2$, 12$_3$, . . . , 12$_n$ may be placed in a predetermined pattern so that they overlap all cells of the storage area 16. However, the readers 12$_1$, 12$_2$, 12$_3$, . . . , 12$_n$ can be placed so that there are gaps the cells of the storage area 16 that they cover. If one or more cells are left uncovered, or if parts of one or more cells are left uncovered, the asset in such non-coverage areas is determined to be located in such non-coverage areas when none of the readers is able to read the tag. This determination assumes that the tag indeed is present somewhere in the area. In any event, it is desirable to determine an optimal placement of the readers 12$_1$, 12$_2$, 12$_3$, . . . , 12$_n$ that maximizes the average accuracy with which the readers 12$_1$, 12$_2$, 12$_3$, . . . , 12$_n$ locate the RFID tags 14$_1$, 14$_2$, 14$_3$, 14$_4$, 14$_5$, . . . , 14$_m$. Various constraints, such as a cost constraint, can be imposed when the optimum placements are determined.

For example, the objective of this optimal placement is to maximize $\lambda$=f(K,reader positioning) under a constraint such as Cost $\leq C_{max}$, where $\lambda$ is the average accuracy, and where K is the number of readers. As will be evident from the description below, the ranges of the readers do not necessarily have to be equal.

In order to determine the average accuracy $\lambda$, the storage area 16 is divided into a grid of M*N cells, where M is the number of cells in one direction and N is the number of cells in the other direction. Hence, the total number T of cells is given by T=M*N. An example of this grid is given immediately below.

| N | | | | |
|---|---|---|---|---|
| . . . | | | | |
| 3 | | | | |
| 2 | | | | |
| 1 | 2 | 3 | . . . | M |

Several assumption may be made, although one or more of these assumptions are not necessary. For example, it may be assumed that K is the number of readers, that the range of the readers is known and hence the cells within the range of each reader is known, that each reader can be placed only at one of the four corners of any cell such that there will be a total of (M+1)*(N+1) possible locations for the first reader being placed, and that no two readers can be co-located (given the same location).

The objective is to place these K readers in the grid so that the locations of tags in the grid can be determined with the maximum possible average accuracy. Here, average accuracy refers to the average across all cells. Each cell can have an accuracy associated with it as described later. Accuracy for a cell i may be defined, for example, as the number of cells in the "answer set $S_i$," where the answer is the set of cells that is identified by the above formula (1) and that could contain a tag if the tag is indeed present in cell i. Accuracy can then be measured, for example, as the inverse of the number of cells in the answer. In this case, the objective is to maximize the average accuracy of the formula (1).

For example, if a tag is present in cell 9, and if the formula (1) gives the answer as S, where S is the set containing cells 8, 9, and 10 (so that S={8,9,10}), the tag can be present in any of the 3 cells and, hence, the accuracy of the formula (1) for cell 9 is the inverse of 3, or 0.333. The ideal accuracy is 1.

So, the average accuracy $\lambda$ may be given by the following equation:

$$\lambda = \left\{ \left( \sum_{i=1}^{T} n_i \right) / T \right\}^{-1} \qquad (2)$$

where i is the cell number and varies from 1 to T, where $n_i$=the number of cells in set $S_i$, and where the set $S_i$ is the answer (i.e., the set of possible cells) provided by the formula (1) if the tag is actually present in cell i. The optimum configuration of the readers is the configuration with the highest average accuracy $\lambda$.

The number P of possible locations for a reader is (M+1)*(N+1), and the number L of possible configurations is P!/(P−K)! where K readers can be placed in any of the P locations and where it is assumed that the ranges of the readers are different. However, if it is assumed that the ranges of the readers are equal, the number L of possible configurations is P!/(K!*(P−K)!).

Hence, the best configuration, B, is the configuration giving the maximum average accuracy $\lambda_B$ according to the following equation:

$$\lambda_B = \max(\lambda_1, \lambda_2, \ldots, \lambda_L) \qquad (3)$$

The number K of readers should be chosen to ensure that the constraints such as the cost constraint are met.

Figure 6:
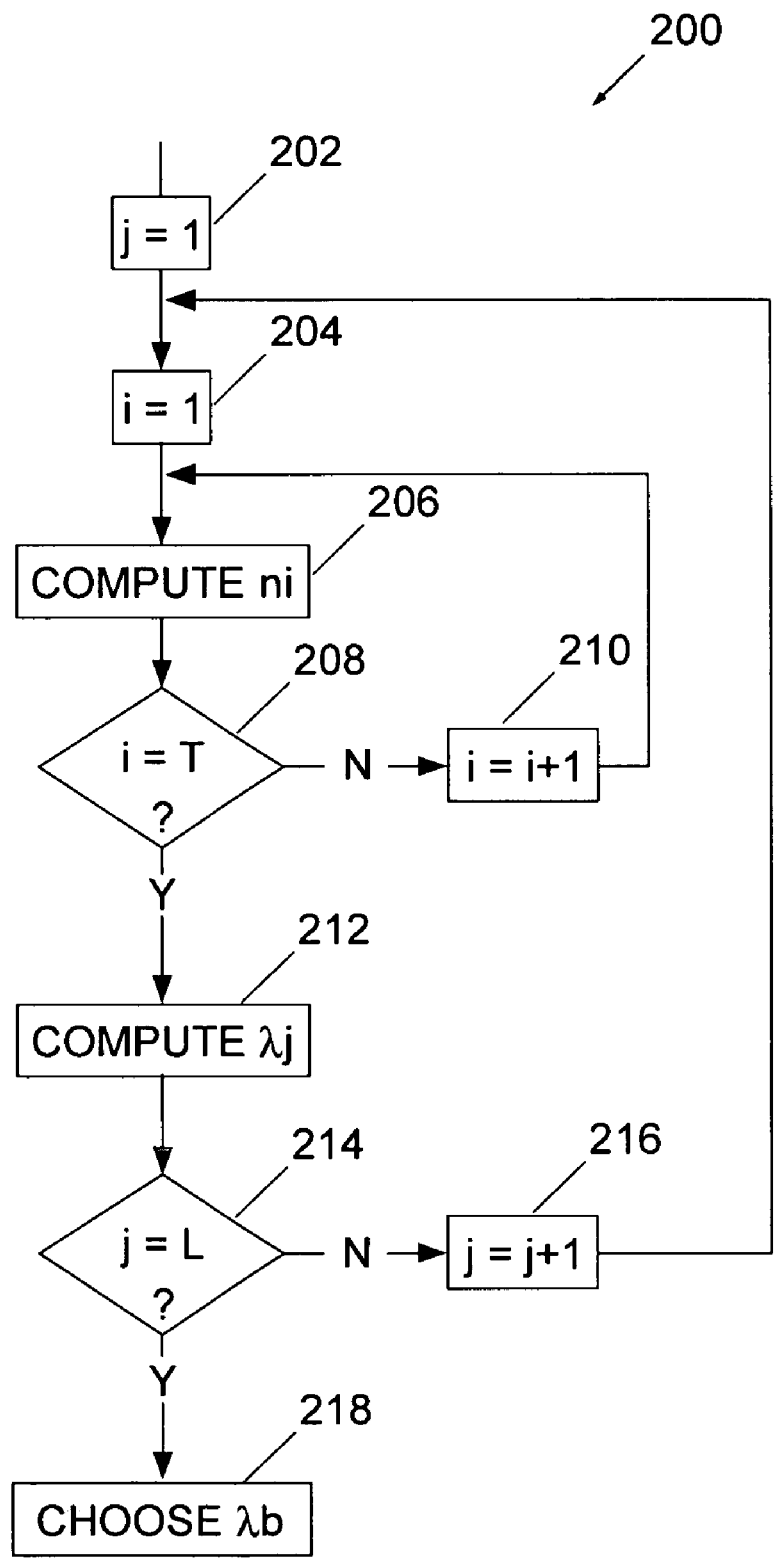

In determining the maximum average accuracy $\lambda_B$, a program 200 as shown in FIG. 6 may be executed. The number K of readers in the area 16 is determined according to one or more desired constraints such as a cost constraint. Also, the area 16 is divided into a grid of cells, and the possible configurations L of the K readers in the grid are determined. For example, as discussed above, one possible constraint in determining the possible configurations L is that each reader can be placed only at one of the four corners of any cell. Another possible constraint is that the outer edges of the of the cells of the area should be rectilinear. Otherwise, the cells can be of any size and shape. This constraint may be desired to ensure that the number of possible reader locations, P, is a finite number. Also, the cell size may be made sufficiently small to minimize the impact of the rectilinear constraint and to enhance accuracy of the algorithm. If the cell size is too large, the optimality of reader placement and asset detection may be limited. However, any other placement constraints can be alternatively or additionally used.

At 202, a variable j is set to one. The variable j is used to designate a corresponding one of the L possible configurations. Accordingly, with the variable j set to one, the program 200 processes the first of the L possible configurations. At 204, a variable i is set to one. The variable i is used to designate a cell in which an RFID tag is located. Accordingly, with the variable i set to one, the RFID tag is placed in a first of the T cells. At 206, the number $n_i$ of cells in the set $S_i$, where the set $S_i$ is the answer (i.e., the set of possible cells) provided by the formula (1) with the RFID tag in cell i, is computed.

At 208, a test is made to determine whether i=T, that is, whether the RFID tag has been moved to all of the cells T. If not, the variable i is incremented by one at 210, and program flow returns to 206 to compute the number $n_i$ of cells in the set $S_i$ with the RFID tag located in the next cell. When i=T, the average accuracy $\lambda_j$ is computed at 212 in accordance with equation (2) by summing all of the $n_i$ computed at 206, by dividing the resulting sum by T, and by inverting the division result.

At 214, a test is made to determine whether j=L, that is, whether all of the possible reader configurations have been tested. If not, the variable j is incremented by one at 216, and program flow returns to 204 to compute the next average accuracy $\lambda_j$. When j=L, the reader configuration that produces the maximum average accuracy $\lambda_B$ is chosen at 218 in accordance with equation (3) and is used to place the readers around the area 16.

This present invention is applicable to warehouses, security systems, etc. Any scenario where there is a region containing a set of assets that need to be located from time to time can benefit from the present invention. The present invention can also be applied to systems that provide alarms if the location of an asset changes.

Certain modifications of the present invention have been discussed above. Other modifications of the present invention will occur to those practicing in the art of the present invention. For example, although the present invention has been described above in connection with RFID technology, the present invention can instead be applied using any other suitable technology with 'sensory' capabilities (for example, cameras which have 'visual' capabilities).

Moreover, the readers $12_1$, $12_2$, $12_3$, ..., $12_n$ in the description are assumed to be static, i.e., they do not move. However, this assumption is not necessary. For example, if the readers $12_1$, $12_2$, $12_3$, ..., $12_n$ carry a GPS tag, they can be dynamic and the location of assets in their range can be identified at any given point of time by first identifying the relative location of tags with respect to the readers and then identifying the absolute location of the readers themselves. The covered cells can be determined from the location of the readers.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of locating an asset in an area comprising:
   reading the asset;
   making a first determination based on which of a plurality of readers are able to read the asset;
   making a second determination based on which of the readers are not able to read the asset; and,
   locating the asset in the area based on both the first and second determinations.

2. The method of claim 1 wherein the area is divided into cells, wherein each of the readers is located to have a different cell coverage, wherein the making of a first determination comprises making the first determination based on the cells that are covered by the readers that are able to read the asset, wherein the making of a second determination comprises making the second determination based on the cells that are covered by the readers that are not able to read the asset, and wherein the locating of the asset comprises locating the asset in the area based on the cells that are covered by the readers that are able to read the asset and the cells that are covered by the readers that are not able to read the asset.

3. The method of claim 2 wherein the locating of the asset comprises:
   forming an intersection of the cells that are covered by the readers that are able to read the asset;
   forming a union of the cells that are covered by the readers that are not able to read the asset; and,
   determining the location of the asset in the area from the intersection and the union.

4. The method of claim 3 wherein the determining of the location of the asset comprises determining the asset to be in the cells that are in the intersection and that are not in the union.

5. The method of claim 1 wherein the reading of the asset comprises receiving an RF signal from an RFID tag attached to the asset, wherein the making of a first determination comprises making the first determination based on which of the readers receive the RF signal, and wherein the making of a second determination comprises making a second determination based on which of the readers do not receive the RF signal.

6. The method of claim 5 wherein the area is divided into cells, wherein each of the readers includes an RF receiver and is located to have a different cell coverage, wherein the making of a first determination comprises making the first determination based on the cells that are covered by the receivers that receive the RF signal, wherein the making of a second determination comprises making the second determination based on the cells that are covered by the receivers that do not receive the RF signal, and wherein the locating of the asset comprises locating the asset in the area based on the cells that are covered by the receivers that receive the RF signal and the cells that are covered by the receivers that do not receive the RF signal.

7. The method of claim 6 wherein the locating of the asset comprises:
   forming an intersection of the cells that are covered by the receivers that receive the RF signal;
   forming a union of the cells that are covered by the receivers that do not receive the RF signal; and,
   determining the location of the asset in the area from the intersection and the union.

8. The method of claim 7 wherein the determining of the location of the asset comprises determining the asset to be in the cells that are in the intersection and that are not in the union.

9. The method of claim 1 wherein the first determination contains all of the cells covered by all of the readers in the event that none of the readers successfully read the asset.

10. The method of claim 1 wherein the locating of the asset comprises:
    forming an intersection of the readers that are able to read the asset;
    forming a union of the readers that are not able to read the asset; and,
    determining the location of the asset in the area from the intersection and the union.

11. A method of locating an asset by use of a plurality of readers comprising:
    storing geographical information of a plurality of virtual cells defined by boundaries, wherein the virtual cells define an area known to contain the asset, and wherein the geographical information includes information about the cells covered by each of the readers;
    identifying a first group of cells corresponding to those of the readers that read the asset;
    identifying a second group of cells corresponding to those of the readers that do not read the asset; and,
    locating the asset based on both the first and second groups of cells.

12. The method of claim 11 wherein the locating of the asset comprises:
    forming an intersection of the cells in the first group of cells;
    forming a union of the cells in the second group of cells; and,
    determining the location of the asset in the area from the intersection and the union.

13. The method of claim 12 wherein the determining of the location of the asset comprises determining the asset to be in the cells that are in the intersection and that are not in the union.

14. The method of claim 11 wherein an RFID tag is attached to the asset, wherein the identifying of a first group of cells comprises identifying the first group of cells based on those readers that receive an RF signal from the RFID tag, and wherein the identifying of a second group of cells comprises identifying the second group of cells based on those readers that do not receive an RF signal from the RFID tag.

15. The method of claim 14 wherein the locating of the asset comprises:
    forming an intersection of the cells in the first group of cells;
    forming a union of the cells in the second group of cells; and,
    determining the location of the asset in the area from the intersection and the union.

16. The method of claim 15 wherein the determining of the location of the asset comprises determining the asset to be in the cells that are in the intersection and that are not in the union.

17. The method of claim 11 wherein the first group of cells contains all of the virtual cells in the event that none of the readers successfully read the asset.

18. A method of placing readers in an area defined by a plurality of virtual cells comprising:
    computing an accuracy associated with each of a plurality of possible reader configurations, wherein each possible reader configuration corresponds to a possible configuration with which the readers can be placed in the area, and wherein each accuracy is dependent upon a number of possible cells in which an asset could be located as a function of a first number of cells covered by ones of the readers that are able to read the asset and a second number of cells covered by remaining ones of the readers that cannot read the asset; and,
    choosing the reader configuration that produces the highest accuracy.

19. The method of claim 18 further comprising determining a number of readers to be distributed among the cells according to a constraint.

20. The method of claim 19 wherein the constraint comprises a cost constraint.

21. The method of claim 18 further comprising determining the plurality of possible reader configurations according to P and K, wherein P comprises a number of possible locations of the readers in the area, and wherein K comprises the number of readers to be distributed throughout the area.

22. The method of claim 21 wherein the determining of the plurality of possible reader configurations according to P and K comprises determining a number L of possible configurations according to the following equation:

$$L=P!/(P-K)!$$

for readers which have different ranges.

23. The method of claim 21 wherein the determining of the plurality of possible reader configurations according to P and K comprises determining a number L of possible configurations according to the following equation:

$$L=P!/(K!*(P-K)!)$$

for readers having substantially equal ranges.

24. The method of claim 18 wherein the computing of an accuracy associated with each of a plurality of possible reader configurations comprises:
    (a) determining a number $n_i$ in accordance with a location i of the asset in each of the virtual cells, wherein the number $n_i$ is dependent upon a corresponding number of possible cells within which the asset could be located as a function of a first number of cells covered by ones of the readers that are able to read the asset and a second number of cells covered by remaining ones of the readers that cannot read the asset for the asset in cell i;
    (b) computing the accuracy associated with a possible configuration by summing all $n_i$ for that configuration;
    (c) repeating (a) and (b) for each of the possible reader configurations; and,
    choosing the reader configuration that produces the highest accuracy.

25. The method of claim 24 wherein (b) the computing of the accuracy associated with a possible configuration by summing all $n_i$ for that configuration comprises:

dividing the sum of all $n_i$ by the total number of virtual cells; and, inverting the division result.

26. The method of claim 18 wherein the choosing of the configuration that produces the highest accuracy comprises choosing of the configuration that produces the highest average accuracy.

27. A method of locating an asset in an area comprising:

reading the asset by use of a plurality of readers;

making a first calculation based on those of the readers that are able to read the asset;

making a second calculation based on those of the readers that are not able to read the asset; and, locating the asset in the area based on both the first and second calculations.

28. The method of claim 27 wherein the making of a first calculation comprises forming an intersection of the readers that are able to read the asset, and wherein the making of a second calculation comprises forming a union of the readers that are not able to read the asset.

* * * * *